United States Patent [19]

Imazeki et al.

[11] Patent Number: 4,507,221

[45] Date of Patent: Mar. 26, 1985

[54] ANTHRAQUINONE DYE AND LIQUID CRYSTAL COMPOSITION CONTAINING THE SAME

[75] Inventors: Shuji Imazeki; Akio Mukoo; Mikio Sato, all of Ibaraki; Masaharu Kaneko, Kanagawa; Tetsuo Ozawa, Tokyo; Tomio Yoneyama, Kanagawa, all of Japan

[73] Assignees: Mitsubishi Chemical Industries Limited; Hitachi, Ltd., both of Tokyo, Japan

[21] Appl. No.: 510,111

[22] Filed: Jul. 1, 1983

[30] Foreign Application Priority Data

Jul. 1, 1982 [JP] Japan ................................. 57-114506
Jul. 1, 1982 [JP] Japan ................................. 57-114507

[51] Int. Cl.$^3$ .......................... C09K 3/34; G02F 1/13; C09B 1/26
[52] U.S. Cl. ................................. 252/299.1; 260/377; 350/349
[58] Field of Search ................. 252/299.1; 260/376, 260/377; 350/349

[56] References Cited

U.S. PATENT DOCUMENTS

| 3,475,173 | 10/1969 | Kimura et al. | 252/299.1 |
| 4,360,447 | 11/1982 | Morinaka et al. | 252/299.1 |
| 4,363,743 | 12/1982 | Moeller et al. | 252/299.1 |

FOREIGN PATENT DOCUMENTS

| 26004 | 4/1981 | European Pat. Off. | 252/299.1 |
| 38460 | 10/1981 | European Pat. Off. | 252/299.1 |
| 54217 | 6/1982 | European Pat. Off. | 252/299.1 |
| 75173 | 3/1983 | European Pat. Off. | 252/299.1 |
| 76633 | 4/1983 | European Pat. Off. | 252/299.1 |
| 2614604 | 10/1977 | Fed. Rep. of Germany | 252/299.1 |
| 3038372 | 5/1981 | Fed. Rep. of Germany | 252/299.1 |
| 57-92079 | 6/1982 | Japan | 252/299.1 |
| 2074182 | 10/1981 | United Kingdom | 252/299.1 |

*Primary Examiner*—Teddy S. Gron
*Attorney, Agent, or Firm*—Sughrue, Mion, Zinn, Macpeak and Seas

[57] ABSTRACT

An anthraquinone dye and a liquid crystal composition containing the same are disclosed. The anthraquinone dye shows a cyan color and has excellent order parameter, solubility and stability. The liquid crystal composition is particularly used in an electro-optic cell, which is interposed between two facing electrode plates and permits the realization of good color displays utilizing the guest-host effect of a liquid crystal.

4 Claims, 5 Drawing Figures

ANTHRAQUINONE DYE AND LIQUID CRYSTAL COMPOSITION CONTAINING THE SAME

FIELD OF THE INVENTION

The present invention relates to an anthraquinone dye and a liquid crystal composition containing the same, and more particularly, it relates to a liquid crystal composition containing a specific dye for used in an electrooptic cell, which is interposed between two facing electrode plates and permits the realization of good color displays utilizing the guest-host effect of a liquid crystal.

BACKGROUND OF THE INVENTION

Pleochroic dyes are roughly classified into two groups. One group dyes are those in which the direction of transition moment of visible light absorption is almost in parallel with the direction of the longer axis of the molecule and which, when dissolved as a guest molecule in a host liquid crystal, are aligned so that the direction of the longer axis of the dye molecule becomes the same as that of the axis of oriented liquid crystal molecule. Such dyes are called pleochroic dyes having parallel dichroism (or P-type dyes). The other group dyes are those in which the direction of transition moment of visible light absorption is almost perpendicular to the direction of the longer axis of molecule and which, when dissolved as a guest molecule in a liquid crystal, are aligned so that the direction of the longer axis of the dye molecule becomes the same as that of the axis of oriented liquid crystal molecule. Such dyes are called pleochroic dyes having perpendicular dichroism (or N-type dyes). The present invention relates to a liquid crystal composition containing a dye belonging to the first group, i.e., pleochroic dye having parallel dichroism.

Pleochroic dyes are characterized in that the degree of light absorption depends upon the relative relation between the direction of absorption transition moment of dye molecule and that of electric vector of light. That is, the absorption becomes maximum when the direction of absorption transition moment is in parallel with the electric vector of light, and becomes minimum when the direction of absorption transition moment is perpendicular to the electric vector of light.

Therefore, in the case of the pleochroic dyes showing parallel dichroism, as shown in FIG. 1 the absorption strength is large when the dye molecule is aligned to the direction as shown 3 with respect to the light 2 polarized in the direction shown by the arrow 1 and the absorption strength is small when aligned in the direction as shown 4 and 5.

When a nematic, cholesteric or smectic liquid crystal containing such pleochroic dye is sandwiched between facing two electrodes and a voltage is applied to it across the electrodes, the liquid crystal molecules exhibit turbulent motion or are uniformly aligned along the direction of electric field depending upon the dielectric characteristics or fluid characteristics of the liquid crystal. In this occasion, the pleochroic dye molecules also move together with the liquid crystal molecules, and hence relative relation between the direction of absorption transition moment of the pleochroic dye molecule and the electric vector of incident light is changed, and consequently, the light absorption characteristics of a liquid crystal display devices are changed.

Such a phenomenon is widely known as "guest-host effect" and a color display device using electric control can be constituted by utilizing this effect (see "Guest-Host Interaction in Nematic Liquid Crystals: A New Electro-Optic Effects" reported by G. H. Heilmeier and L. A. Zanoni in Applied Physics Letters, Vol. 13, p. 91 (1968)).

For example, when a nematic liquid crystal containing a pleochroic dye showing a parallel dichroism is interposed between two transparent electrode plates having been subjected to homogeneous orientation treatment and facing the parallel with respect to each other, the liquid crystal molecules form a homogeneous alignment wherein the long axes of the molecules are aligned in a direction parallel with the electrode planes (see FIG. 2). In this situation, the molecules 10 of pleochroic dye dissolved in the liquid crystal are also aligned so that their long axes are also parallel with the electrode planes in the same direction. When white light 11 having travelling in a direction perpendicular to the electrode plane and which is polarized in the same direction as in the alignment direction of crystals by a polarizing plate 13 is transmitted through the guest-host material in the above-described alignment, the electric vector of incident white light is parallel with the long axes of the pleochroic dye molecules, and hence a specific wavelength region of the incident light is strongly absorbed by the pleochroic dye guest material. As a result, the guest-host material appears colored. When an electric field is applied to the liquid crystal material in the above-described alignment through the transparent electrode plate, if it has a positive dielectric anisotropy, the host liquid crystal molecules 9 and the guest pleochroic dye molecules take on a homeotropic alignment wherein the axes of the molecules are perpendicularly aligned with respect to the electrode planes, due to the positive dielectric anisotropy of the host liquid crystal (see FIG. 3). In this situation, the electric vector of the incident white polarized light 11 is perpendicular to the axes of the pleochroic dye molecules, and hence the incident light is only scarcely absorbed by the pleochroic dye molecules, and the guest-host material appears weakly colored. Accordingly, the difference in color between the colored state and the weakly colored state enables the formation of optical displays by electric driving.

The above is an embodiment utilizing a nematic liquid crystal as a host liquid crystal. Other representative system of the guest-host type crystal display is utilization of cholesteric-nematic phase separation. This is the system using a liquid crystal showing a cholesteric state as a host liquid crystal. This system has two cases: one is use of a liquid crystal showing an inherent cholesteric state and other is use of a liquid crystal in which a suitable optically active material is added to an inherent nematic liquid crystal to show a cholesteric state.

For example, when a cholesteric liquid crystal containing a pleochroic dye showing a parallel dichroism and that the dielectric anisotropy is positive is interposed between two transparent plates having been subjected to homogeneous orientation treatment and facing the parallel with respect to each other, the liquid crystal molecules form the spiral molecule alignment. Similarly, the pleochroic dye molecules dissolved in the liquid crystal also form the spiral molecule alignment. When white natural light having travelling in a direction perpendicular to the electrode plane is transmitted through the guest-host material in the above-described alignment, dye molecules show various directions and hence a specific wavelength region of all polarizing components is specifically strongly absorbed by the pleochroic dye molecules. As a result, the guest-host material appears strongly colored. When an electric field is applied to the liquid crystal material in the above-described alignment through the transparent electrode plate, the spiral molecule alignment is released and the host liquid crystal molecules and the guest pleochroic dye molecules take on a homeotropic alignment wherein the long axes of the molecules are perpendicularly aligned with respect to the electric field direction. In this situation, the long axes of the pleochroic dye molecules are perpendicular to the electric vector of the incident white light, and hence the incident white light is only scarcely absorbed by the pleochroic dye molecules. As a result, the guest-host appears whitened suth that the electric field applied area is weakly colored and the display is possible.

The above is examples of a guest-host type liquid crystal display wherein the nematic liquid crystal and the cholesteric liquid crystal are used as the host liquid crystal. Even in the case of using the sumectic liquid crystal as the host liquid crystal, display is also possible by employing a suitable cell structure and driving method as similar to the nematic and cholesteric liquid crystals.

The pleochroic dyes used as a guest in a liquid crystal display utilizing the above-described guest-host effect are required to possess: (1) a high "order parameter" in a host liquid crystal; (2) a hue according to the end-use; (3) a sufficient solubility in a host liquid crystal; and (4) a high stability (light stability, heat stability, and electric stability).

Of the above-described requirements, order parameter (1) (usually presented as S) means the degree of alignment of absorption axis of dye molecule with respect to orientation direction of host liquid crystal molecules, and is defined by the following equation:

$$S = \tfrac{1}{2}(\overline{3\cos^2\theta} - 1)$$

wherein the term of $\cos^2\theta$ is timewise averaged, and $\theta$ represents an angle which the absorption axis of the dye molecule makes with the orientation direction of host liquid crystal molecules. The order parameter S of pleochroic dye molecule is experimentally determined by the following equation:

$$S = \frac{A_\| - A_\perp}{2A_\perp + A_\|}$$

wherein $A_\|$ and $A_\perp$ represent the absorbances of the dye molecules for the light polarized parallel to and perpendicular to the orientation direction of the host guest crystal, respectively.

Specifically, the order parameter S is a value which governs the contrast of a guest-host type liquid crystal display device. With pleochroic dyes having parallel dichroism, the nearer the value to 1 which is the theoretical maximum, the less the degree of residual color in white background parts, which serves to realize bright and highly contrasty display.

As to the hue (2) referred to hereinbefore, the dyes must satisfy requirements for a wide variety of hues, taking into consideration the purposes of coloration such as to increase displayed information, increase degree of freedom of design, and improve fashionability. Basically, if three primary colors of yellow, magenta, and cyan are obtained, all hues can be obtained by subtractive mixture of them. Therefore, with respect to the problem of hue, the three primary colors of yellow, magenta and cyan become more important.

One object of the present invention is to provide a liquid crystal composition containing a pleochroic dye which satisfies the requirements (1), (3) and (4) described hereinbefore, which shows a cyan color, one of the primary colors, as the hue.

Relationship between the molecular structure of pleochroic dye and the various properties has not fully been clarified yet, and hence it is quite difficult to select a pleochroic dye which has a desired hue and satisfies all requirements described hereinbefore based on knowledges about known dyes.

With the above-described prior art in mind, the inventors have made intensive investigations and, as a result, the inventors have found anthraquinone dyes which show a cyan color and possess excellent order parameter, excellent solubility, and excellent stability, thus having achieved the present invention based on the findings.

SUMMARY OF THE INVENTION

Accordingly, one object of the present invention is to provide an anthraquinone dye represented by the formula (I)

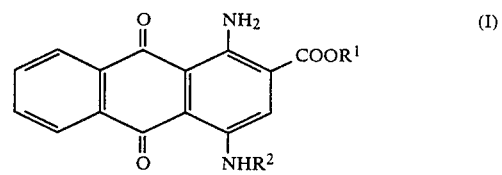

wherein $R^1$ is a trans-4-alkylcyclohexyl group, trans-4-cyclohexylcyclohexyl group, trans-4-alkylcyclohexylcyclohexyl group, p-(trans-4-alkylcyclohexyl)phenyl group, an alkyl group which may be substituted with an alkoxy group or alkylamino group, or an aralkyl or aryl group which may be substituted with an alkyl group, aralkyl group, aryl group, alkoxy group or alkylamino group; and $R^2$ is an alkyl group which may be substituted with an alkoxy group, alkylamino group, cycloalkyl group or alkylcycloalkyl group; or a cycloalkyl, aralkyl or aryl group which may be substituted with an alkyl group, alkoxy group, alkylamino group, cycloalkyl group, alkylcycloalkyl group, aryl group, aralkyl group or alkoxyalkyl group, with proviso that when $R^1$ is a substituted alkyl group, aralkyl group or aryl group, at least one of $R^1$ and $R^2$ is as follows:

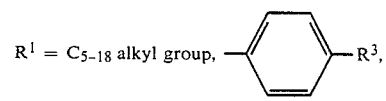

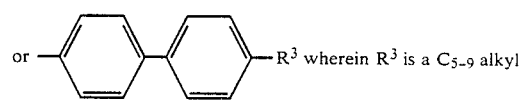

group or alkoxy group; and

R² = C₅₋₁₈ alkyl group, 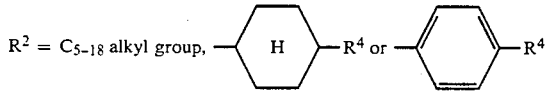

wherein R⁴ is a C₁₋₉ alkyl group, alkoxy group,

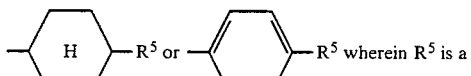 wherein R⁵ is a hydrogen atom or C₁₋₉ alkyl group or alkoxy group.

Another object of the present invention is to provide a liquid crystal composition containing the anthraquinone dye.

DETAILED DESCRIPTION OF THE INVENTION

Figure 2:
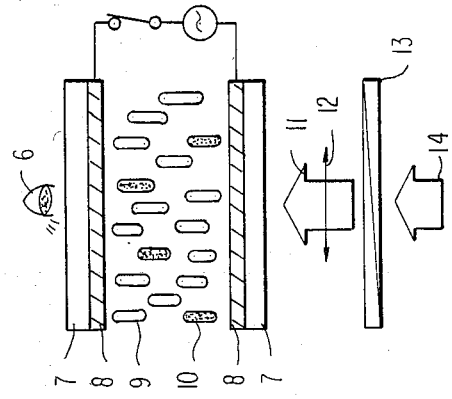
FIG. 2 is a schematic sectional view of a cell of the present invention in a non-voltage-applied state;
6 . . . Observer
7 . . . Transparent glass substrate
8 . . . Transparent electrode having been subjected to a homogeneous alignment treatment
9 . . . Nematic host liquid crystal molecule having a positive dielectric anisotropy
10 . . . Pleochroic dye molecule
11 . . . Incident white polarized light
12 . . . Polarizing direction of incident light
13 . . . Polarizing plate
14 . . . Incident natural white light
Figure 3:
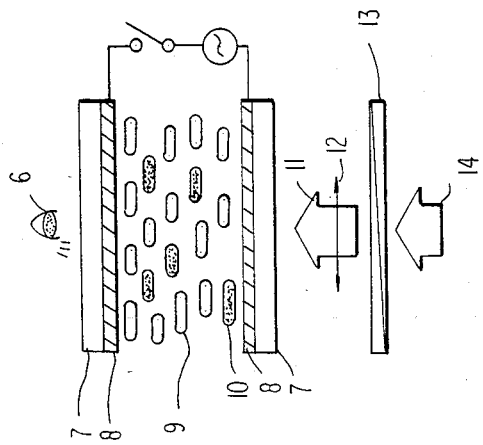
FIG. 3 is a schematic sectional view of a cell of the present invention in a voltage-applied state;
6 . . . Observer
7 . . . Transparent glass substrate
8 . . . Transparent electrode having been subjected to a homogeneous alignment treatment
9 . . . Nematic host liquid crystal molecule having a positive dielectric anisotropy
10 . . . Pleochroic dye molecule
11 . . . Incident white polarized light
12 . . . Polarizing direction of incident light
13 . . . Polarizing plate
14 . . . Incident natural white light.
Figure 1:
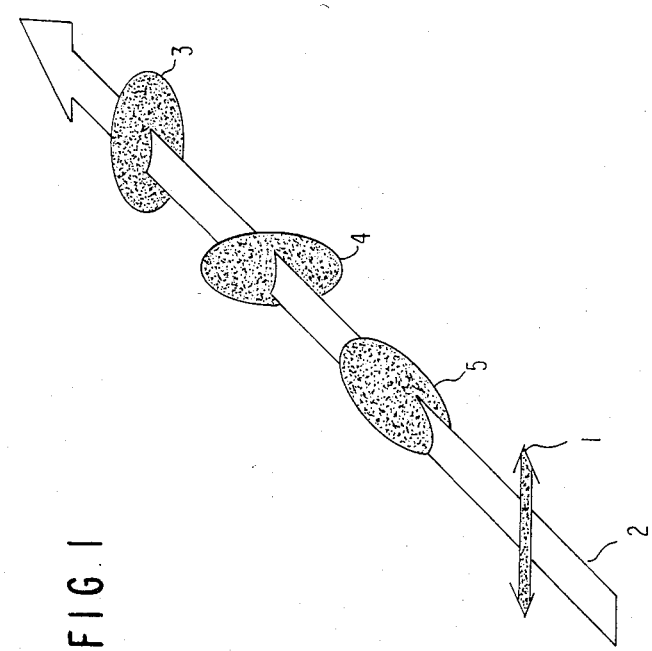
FIG. 1 is a schematic view showing a relationship on a relative direction between a pleochroic dye and light;
1 . . . Polarizing direction of light
2 . . . Light
3, 4 and 5 . . . Pleochroic dye molecule.

The anthraquinone dye represented by the formula (I) can be prepared by reacting 1-amino-2-carboxy-4-bromoanthraquinone with $NH_2R^2$ wherein $R^2$ is the same as defined in the above formula (I) in the conventional manner to give a compound of the formula (II)

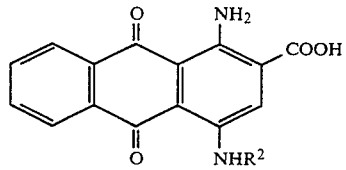

and then esterifying the compound with $R^1OH$ wherein $R^1$ is the same as defined in the above formula (I) in the conventional manner.

Examples of the substituent represented by $R^1$ in the above formula (I) include trans-4-methylcyclohexyl group, trans-4-ethylcyclohexyl group, trans-4-n-propylcyclohexyl group, trans-4-n-butylcyclohexyl group, trans-4-n-pentylcyclohexyl group, trans-4-n-hexylcyclohexyl group, trans-4-n-heptylcyclohexyl group, trans-4-n-octylcyclohexyl group, trans-4-cyclohexylcyclohexyl group, trans-4-n-propylcyclohexylcyclohexyl group, trans-4-n-pentylcyclohexylcyclohexyl group, trans-4-n-heptylcyclohexylcyclohexyl group, p-(trans-4-n-propylcyclohexyl)phenyl group, p-(trans-4-n-pentylcyclohexyl)phenyl group, p-(trans-4-n-heptylcyclohexyl)phenyl group, methyl group, ethyl group, n-propyl group, n-butyl group, n-pentyl group, n-hexyl group, n-heptyl group, n-octyl group, n-nonyl group, n-decyl group, n-dodecyl group, n-octadecyl group, benzyl group, 2-phenylethyl group, 3-phenylethyl group, 2-phenoxyethyl group, ethoxyethyl group, n-propoxybutyl group, n-butoxyethyl group, 2-dimethylaminoethyl group, 2-diethylaminoethyl group, 3-dimethylamino-n-propyl group, phenyl group, p-ethylphenyl group, p-n-propylphenyl group, p-n-butylphenyl group, p-n-pentylphenyl group, p-n-hexylphenyl group, p-n-heptylphenyl group, p-n-octylphenyl group, p-n-dodecylphenyl group, p-n-propoxyphenyl group, p-n-butoxyphenyl group, p-n-pentyloxyphenyl group, p-n-heptyloxyphenyl group, p-(p'-n-propylphenyl)phenyl group, p-(p'-n-pentylphenyl)phenyl group, p-(p'-n-heptylphenyl)phenyl group, p-(p'-n-propoxyphenyl)phenyl group, p-(p'-n-pentyloxyphenyl)phenyl group, or the like.

Examples of the substituent represented by $R^2$ in the above formula (I) include alkyl groups such as methyl group, ethyl group, n-propyl group, n-butyl group, n-pentyl group, n-hexyl group, n-heptyl group, n-octyl group, n-nonyl group, n-decyl group, n-dodecyl group or n-octadecyl group, benzyl group, 2-phenylethyl group, 3-phenylpropyl group, ethoxyethyl group, 3-isopropoxypropyl group, 2-dimethylaminoethyl group, 2-diethylaminoethyl group, 3-dimethylamino-n-propyl group, 3-diethylamino-n-propyl group, cyclohexyl group, 4-n-propylcyclohexyl groups, 4-n-butylcyclohexyl group, 4-n-pentylcyclohexyl group, 4-n-hexylcyclohexyl group, 4-n-heptylcyclohexyl group, 4-n-propoxycyclohexyl group, 4-n-pentyloxycyclohexyl group, 4-n-heptyloxycyclohexyl group, 4-n-heptyloxycyclohexyl group, 4-n-propylcyclohexylcyclohexyl group, 4-n-pentylcyclohexylcyclohexyl group, 4-n-heptylcyclohexylcyclohexyl group, p-tolyl group, p-n-propylphenyl group, p-n-butylphenyl group, p-n-pentylphenyl group, p-n-hexylphenyl group, p-n-octylphenyl group, p-methoxyphenyl group, p-n-propoxyphenyl group, p-n-pentyloxyphenyl group, p-n-decyloxyphenyl group, p-n-butoxymethylphenyl group, p-(4-n-propylcyclohexyl)phenyl group, p-(4-n-pentylcyclohexyl)phenyl group, p-(4-n-heptylcyclohexyl)phenyl group, p-(p-n-pentylphenyl)phenyl group, p-(p-n-propoxyphenyl)phenyl group, or the like.

The anthraquinone dye represented by formula (I) in the present invention has a good solubility in the host liquid crystal and exhibits a good order parameter. It is believed this is due to the fact that $R^1$ and $R^2$ have a long carbon chain and $R^1$ is a trans-cycloalkyl group or a group containing it.

It was first considered that the anthraquinone dye represented by the above formula (I) loses the linearity of the molecule and decreases in the order parameter if the carbon chain of $R^2$ is long, but unexpectedly it was found that the anthraquinone dye rather exhibits a preferred value of the order parameter.

The nematic liquid crystal as used herein can be selected from a wide variety of nematic liquid crystals, as long as they show a nematic state in an operating temperature range. Addition of optically active substances as described hereinafter to such nematic liquid crystals can bring about a cholesteric state.

Examples of such nematic liquid crystals include the substances shown in Table 1 below and the derivatives thereof.

TABLE 1

| No. | Type | Example |
|---|---|---|
| 1. | Cyclohexylcyclohexane | 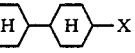 |
| 2. | Phenylcyclohexanone | 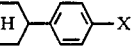 |
| 3. | Biphenyl | 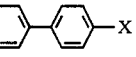 |
| 4. | Terphenyl | 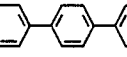 |
| 5. | Cyclohexylcyclohexanoate | 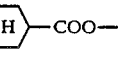 |
| 6. | Phenylcyclohexylcarboxylate | 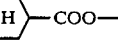 |
| 7. | Ester | 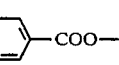 |
| 8. | Diester | 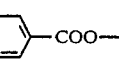 |
| 9. | Biphenylcyclohexylcarboxylate | 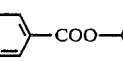 |
| 10. | Biphenylester | 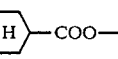 |
| 11. | Thioester | 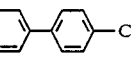 |
| 12. | Schiff | 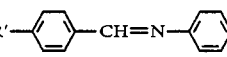 |
| 13. | Pyrimidine | 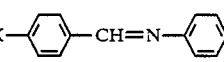 |
| 14. | Dioxane | 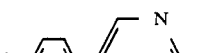 |
| 15. | Cyclohexyl methyl ether | 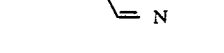 |
| 16. | Cinnamonitrile | 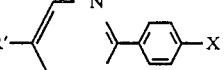 |

In Table 1, R' represents an alkyl group or an alkoxy group, and X' represents a nitro group, a cyano group or a halogen atom.

The liquid crystals shown in Table 1 all have positive dielectric anisotropy. In addition, known ester-, azoxy-, azo-, Schiff-, pyrimidine-, diester- and biphenylester-based liquid crystals having negative dielectric anisotropy can be used in admixture with liquid crystals having positive dielectric anisotropy, provided that the anisotropy of the resulting mixture is positive. Furthermore, liquid crystals having negative dielectric antisotropy can of course be used per se by employing a suitable cell constitution and driving method.

As the host liquid crystal material as used herein, any of the liquid crystals listed in Table 1 and mixtures thereof can be used. It has been found that a liquid crystal material composed of the following four liquid crystal compounds:

| | % by weight |
|---|---|
| C₃H₇–⟨H⟩–⟨⟩–CN | 38.4 |
| C₅H₁₁–⟨H⟩–⟨⟩–CN | 34.2 |
| C₇H₁₅–⟨H⟩–⟨⟩–CN | 18.1 |
| C₅H₁₁–⟨H⟩–⟨⟩–⟨⟩–CN | 9.3 | which is sold under the trade name of ZLI-1132 by E. M. Merck & Co., and a liquid crystal material composed of the following four liquid crystal compounds:

| | % by weight |
|---|---|
| C₅H₁₁–⟨⟩–⟨⟩–CN | 51 |
| C₇H₁₅–⟨⟩–⟨⟩–CN | 25 |
| C₈H₁₇O–⟨⟩–⟨⟩–CN | 16 |
| C₅H₁₁–⟨⟩–⟨⟩–⟨⟩–CN | 8 | which is sold under the trade name of E-7 by British Drug House CO. are particularly useful in the invention.

Examples of optically active substances which can be used in the invention include chiral nematic compounds prepared, for example, by introducing an optically active group, such as a 2-methylbutyl group, a 3-methylbutoxy group, a 3-methylpentyl group, a 3-methylpentoxy group, a 4-methylhexyl group, and a 4-methylhexyloxy group, into a nematic liquid crystal compound. Of course, optically active substances, such as alcohol derivatives, e.g., l-menthol and d-borneol, as disclosed in Japanese Patent Application (OPI) No. 45546/76 (the term "OPI" as used herein refers to a "published unexamined Japanese patent application"), ketone derivatives, e.g., d-camphor and 3-methylcyclohexane, carboxylic acid derivatives, e.g, d-citronellic acid and l-camphoric acid, aldehyde derivatives, e.g., d-citronellal, alkene derivatives, e.g., d-linonene, amines, amides, and nitrile derivatives can be used.

As cells in which the liquid crystal composition of the invention is used, known cells for liquid crystal displays can be used. That is, cells which are generally used are those in which transparent electrodes having an optional pattern are provided on two glass substances at least one of which is transparent and the two glass substrates are opposed with the electrode planes facing each other using an appropriate spacer to keep the substrates parallel to each other. The spacer determines the gap of the cell. From a practical point of view, the cell gap is preferably from 3 to 100 μm, and more preferably from 5 to 50 μm.

Hereinafter examples of pleochroic anthraquinone dyes yielding a cyan color which are used in the liquid crystal compositions of the invention, and liquid crystal compositions containing such pleochroic dyes will be explained in detail with reference to the following examples.

SYNTHESIS EXAMPLE

SYNTHESIS OF 1-AMINO-4-N-BUTYLANILINOANTHRAQUINONE-2-CARBOXYLIC ACID TRANS-4-N-BUTYLCYCLOHEXYL ESTER (No. 7 dye in Table 2):

To 200 ml of orthodichlorobenzene were added 31.6 g of trans-4-n-butylcyclohexanol, 5.6 g of p-toluenesulfonic acid, and 28 g of 1-amino-4-n-butylanilinoanthraquinone-2-carboxylic acid. The mixture was heated slowly to 110° to 115° C. and maintained at this temperature for 17 hours with stirring. The orthochlorobenzene solution was concentrated to 70 ml under reduced pressure, and 1500 ml of methanol was added. The resulting precipitates was filtered out and then purified by column chromatography wherein silica gel was used as a carrier and chloroform was used as a solvent to obtain 17.3 g of 1-amino-4-n-butylanilinoanthraquinone-2-carboxylic acid-trans-4-n-butylcyclohexyl ester.

EXAMPLE 1

The examples of the pleochroic anthraquinone dye used in the present invention are shown in Table 2, along with their maximum absorption wavelength and order parameter.

TABLE 2
| No. | R¹ | R² | Maximum Absorption Wavelength (nm) | Order Parameter |
|---|---|---|---|---|
| 1 | —C$_3$H$_7$ (n) | —OC$_5$H$_{11}$ (n) | 670 | 0.73 |
| 2 | —C$_3$H$_7$ (n) | —C$_4$H$_9$ (n) | 675 | 0.74 |
| 3 | —C$_5$H$_{11}$ (n) | —CH$_2$CH$_2$— | 675 | 0.72 |
| 4 | —C$_4$H$_9$ (n) | — | 670 | 0.72 |
| 5 | —C$_7$H$_{15}$ (n) | — | 670 | 0.73 |
| 6 | —C$_5$H$_{11}$ (n) | —C$_4$H$_9$ (n) | 668 | 0.74 |
| 7 | —C$_4$H$_9$ (n) | —C$_4$H$_9$ (n) | 668 | 0.74 |
| 8 | —C$_4$H$_9$ (n) | —C$_5$H$_{11}$ (n) | 668 | 0.74 |
| 9 | —C$_4$H$_9$ (n) | —C$_4$H$_9$ (n) | 678 | 0.73 |
| 10 | —C$_5$H$_{11}$ (n) | —C$_3$H$_7$ (n) | 678 | 0.74 |
| 11 | —C$_3$H$_7$ (n) | —CH$_2$— | 673 | 0.72 |
| 12 | —C$_4$H$_9$ (n) | —CH$_2$CH$_2$CH$_2$— | 675 | 0.73 |
| 13 | —C$_5$H$_{11}$ (n) | —C$_6$H$_{13}$ (n) | 676 | 0.73 |
| 14 | —C$_6$H$_{13}$ (n) | —CH$_2$CH$_2$N(CH$_3$)$_2$ | 677 | 0.70 |
| 15 | —C$_7$H$_{15}$ (n) | —CH$_2$CH$_2$OCH$_2$CH$_3$ | 677 | 0.74 |
| 16 | —C$_5$H$_{11}$ (n) | —OC$_3$H$_7$ (n) | 677 | 0.74 |
| 17 | —C$_3$H$_7$ (n) | —CH$_3$ | 675 | 0.74 |

TABLE 2-continued
| No. | R¹ | R² | Maximum Absorption Wavelength (nm) | Order Parameter |
|---|---|---|---|---|
| 18 |  |  —C₄H₉ (n) | 675 | 0.75 |
| 19 |  |  | 669 | 0.75 |
| 20 |  —C₃H₇ (n) |  —C₆H₁₃ (n) | 658 | 0.74 |
| 21 |  —C₃H₇ (n) |  —C₇H₁₅ (n) | 668 | 0.74 |
| 22 |  —C₄H₉ (n) |  —C₈H₁₇ (n) | 668 | 0.74 |
| 23 |  —C₅H₁₁ (n) |  —C₃H₇ (n) | 668 | 0.74 |
| 24 |  —C₅H₁₁ (n) |  —C₅H₁₁ (n) | 668 | 0.74 |
| 25 |  —C₄H₉ (n) |  —C₄H₉ (n) | 674 | 0.68 |
| 26 |  —OC₄H₉ (n) |  —C₅H₁₁ (n) | 675 | 0.70 |
| 27 |  —C₄H₉ (n) |  —OCH₃ | 674 | 0.71 |
| 28 |  —C₇H₁₅ (n) |  —C₈H₁₇ (n) | 676 | 0.70 |
| 29 |  —C₄H₉ (n) |  —CH₃ | 676 | 0.68 |
| 30 |  —C₅H₁₁ (n) |  —C₃H₇ (n) | 687 | 0.71 |
| 31 |  —C₄H₉ (n) | —C₅H₁₁ (n) | 684 | 0.69 |
| 32 |  —C₁₂H₂₅ (n) | —C₉H₁₉ (n) | 685 | 0.68 |
| 33 | —C₈H₁₇ (n) |  —OC₁₀H₂₁ (n) | 671 | 0.65 |
| 34 | —C₈H₁₇ (n) |  —C₅H₁₁ (n) | 670 | 0.67 |

TABLE 2-continued

[Structure: anthraquinone with NH₂, COOR¹, NHR² substituents]

| No. | R¹ | R² | Maximum Absorption Wavelength (nm) | Order Parameter |
|---|---|---|---|---|
| 35 | —C₄H₈CH(C₂H₅)(C₃H₇ (n)) | —⟨phenyl⟩—CH₂OC₄H₉ (n) | 670 | 0.64 |
| 36 | —C₇H₁₅ (n) | —⟨cyclohexyl-H⟩ | 675 | 0.65 |
| 37 | —C₉H₁₉ (n) | —⟨cyclohexyl-H⟩—C₄H₉ (n) | 676 | 0.66 |
| 38 | —C₄H₈OC₃H₇ (n) | —C₅H₁₁ (n) | 677 | 0.63 |
| 39 | —C₈H₁₇ (n) | —C₃H₇ (n) | 676 | 0.64 |
| 40 | —C₇H₁₅ (n) | —CH₂—⟨phenyl⟩ | 673 | 0.64 |
| 41 | —C₆H₁₃ (n) | —CH₂CH₂N(CH₃)(CH₃) | 677 | 0.62 |
| 42 | —C₁₀H₂₁ (n) | —C₅H₁₁ (n) | 676 | 0.64 |
| 43 | —C₈H₁₇ (n) | —CH₂CH₂OCH₂CH₃ | 677 | 0.63 |
| 44 | —C₇H₁₅ (n) | —CH₂CH₂CH₂—⟨phenyl⟩ | 675 | 0.64 |
| 45 | —C₄H₉ (n) | —⟨phenyl⟩—C₄H₉ (n) | 670 | 0.66 |
| 46 | —C₃H₆N(CH₃)(CH₃) | —⟨phenyl⟩—C₃H₇ (n) | 670 | 0.63 |
| 47 | —C₃H₆—⟨phenyl⟩— | —⟨phenyl⟩—C₂H₅ (n) | 670 | 0.64 |
| 48 | —C₅H₁₁ (n) | —C₄H₉ (n) | 677 | 0.62 |
| 49 | —C₈H₁₇ (n) | —C₄H₉ (n) | 676 | 0.63 |

The maximum absorption wavelength and order parameter of each dye shown in Table 2 were measured as follows:

To the above-described phenylcyclohexane-based mixed liquid crystal sold under the trade name of ZLI-1132 was added one of the dyes shown in Table 2 as a pleochroic dye. The resulting mixture was heated to at least 70° C., well stirred in the state that the liquid crystal became an isotropic liquid, and thereafter, was allowed to cool.

The thus-prepared liquid crystal composition was sealed in a cell with a gap of 10 to 100 μm comprising two glass substrates having transparent electrodes wherein the surface of the glass substrate coming into contact with the liquid crystal was coated with a polyamide resin, and after hardening of the polyamide resin coating, was subjected to a rubbing treatment to achieve homogeneous orientation. In the cell subjected to the orientation treatment, the liquid crystal composition took on a homogeneous orientation state when no voltage was applied across the electrodes, and the dye molecules also had the same orientation as shown in FIG. 2 following the host liquid crystal.

With the thus-prepared guest-host cell, the absorption spectrum was measured using a polarized light in parallel to the direction of orientation of liquid crystal molecules and a polarized light perpendicular to the direction of orientation, and the absorbances A∥ and A⊥ of the dye to the polarized lights and the maximum absorption wavelength were determined. In determining the absorbance of the dye, corrections were made with respect to the absorption by the host liquid crystal and the reflection loss of the cell. The order parameter S was determined by the following equation:

$$S = \frac{A_{\parallel} - A_{\perp}}{2A_{\perp} + A_{\parallel}}$$

EXAMPLE 2

To the same liquid crystal as used in Example 1 was added Dye No. 4 shown in Table 2, having the formula:

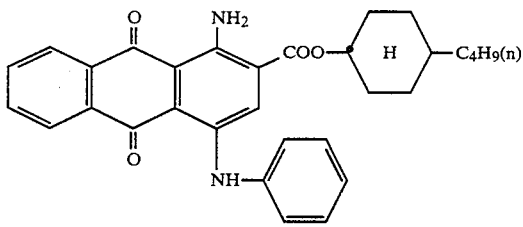

in an amount of 1.04% by weight based on the weight of the liquid crystal to prepare a liquid crystal composition.

Figure 4:
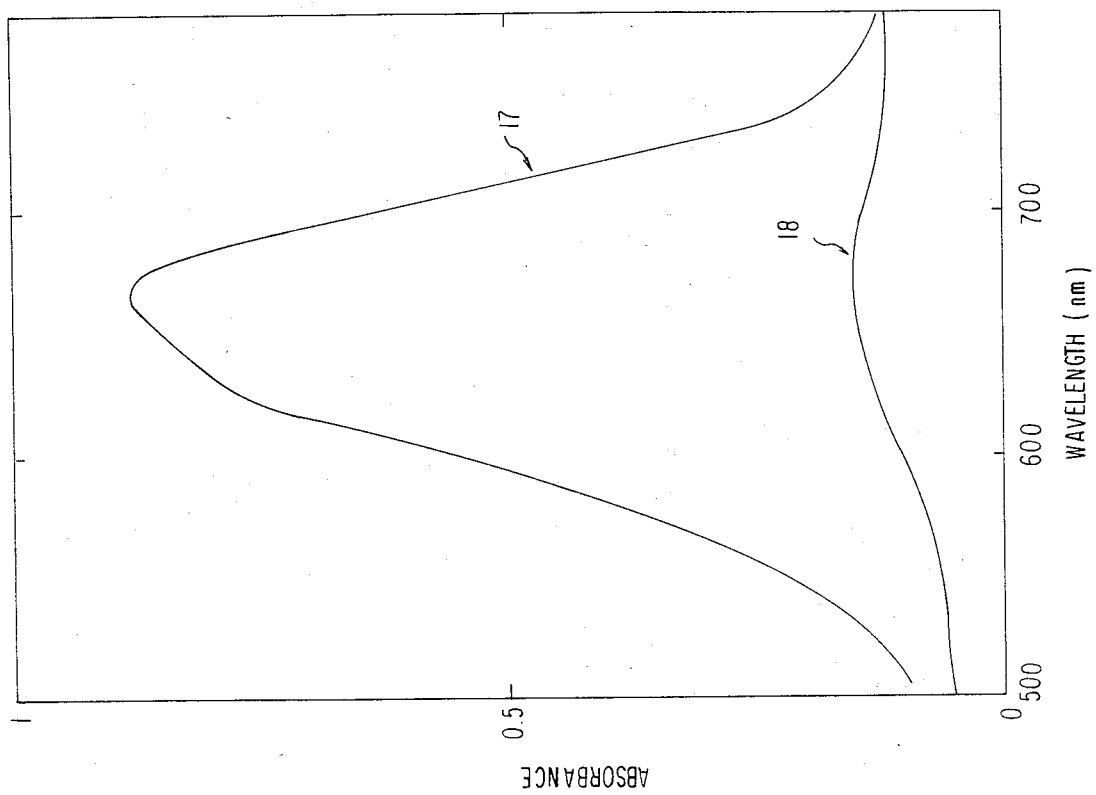
FIGS. 4 and 5 are graphs showing the spectral characteristics of the display cells in Examples 2 and 3 of the present invention.

The thus-prepared liquid crystal composition was sealed in the same cell as used in Example 1 (substrate gap: about 10 μm), and the absorption spectrum thereof was measured in the same manner as in Example 1. The spectrum is shown in FIG. 4 wherein Curves 15 and 16 indicate A// and A⊥, respectively. The maximum absorption wavelength in the visible light region was 670 nm, and A// and A⊥ at the maximum absorption wavelength were 0.722 and 0.083, respectively. Thus, the order parameter of the dye was 0.72.

EXAMPLE 3

To the same liquid crystal as used in Example 1 was added Dye No. 7 shown in Table 2, having the formula:

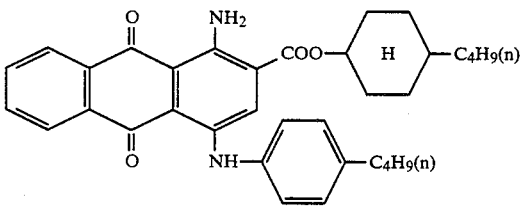

in an amount of 1.18% by weight based on the weight of the liquid crystal to prepare a liquid crystal composition.

Figure 5:
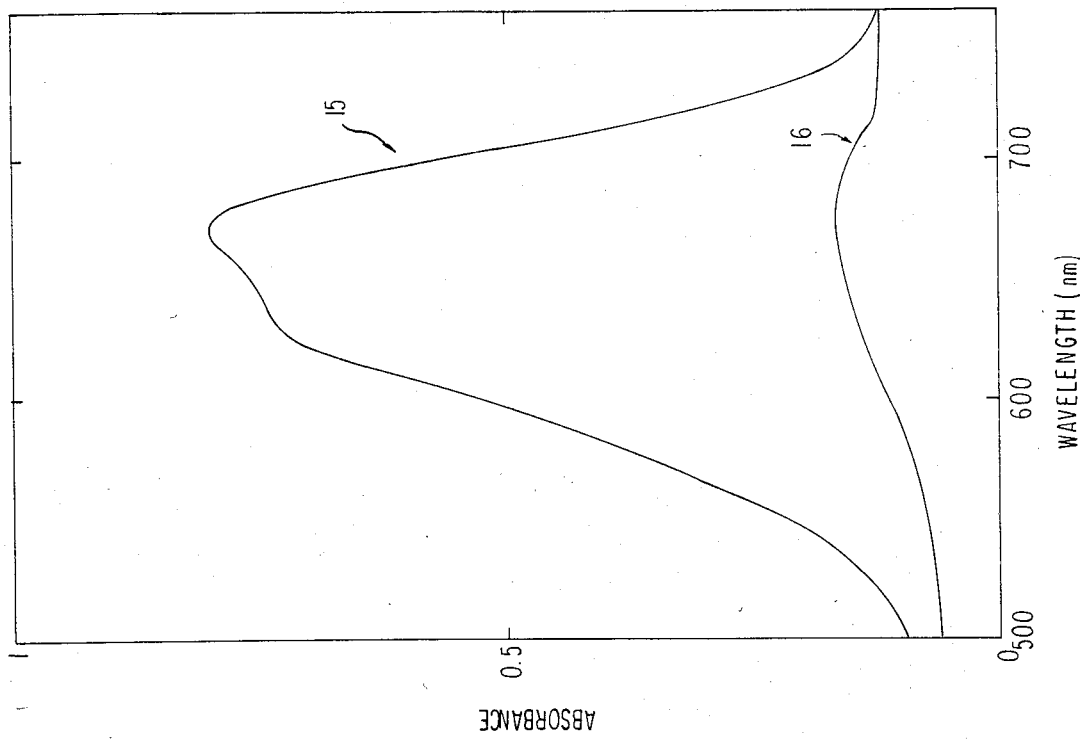

The thus-prepared liquid crystal composition was sealed in the same cell as used in Example 1 (substrate gap: aboaut 10 μm), and the absorption spectrum thereof was measured in the same manner as in Example 1. The spectrum is shown in FIG. 5. In the Figure, the curve 17 indicates A// and the curve 18 indicates A⊥. The maximum absorption wavelength in the visible light region was 668 nm, A//at the maximum absorption wavelength was 0.810 and A⊥ was 0.086. The order parameter S of the dye was calculated to be 0.74.

While the invention has been described in detail and with reference to specific embodiments thereof, it will be apparent to one skilled in the art that various changes and modifications can be made therein without departing from the spirit and scope thereof.

What is claimed is:

1. An anthraquinone dye represented by the formula (I)

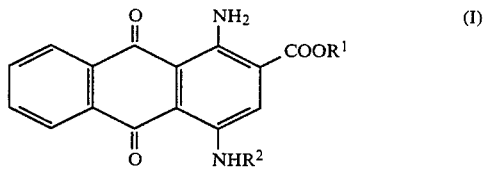

wherein $R^1$ is a trans-4-alkylcyclohexyl group, a trans-4-cyclohexylcyclohexyl group, a trans-4-alkylcyclohexylcyclohexyl group, a p-(trans-4-alkylcyclohexyl)phenyl group, or an aryl group which may be substituted with an alkyl group, or an alkoxy group; and $R^2$ is an alkyl group which may be substituted with an alkoxy group or a cycloalkyl, aralkyl or aryl group which may be substituted with an alkyl group, an alkoxy group or an alkoxyalkyl group, with the proviso that when $R^1$ is a substituted aryl group, at least one of $R^1$ and $R^2$ is as follows:

$R^1$ is

wherein $R^3$ is a $C_{5-9}$ alkyl group or alkoxy group; and
$R^2$ is a $C_{5-18}$ alkyl group,

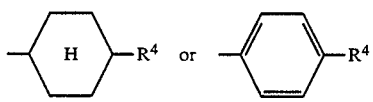

wherein $R^4$ is a $C_{1-9}$ alkyl group, alkoxy group,

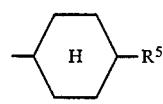

or

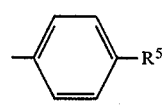

wherein $R^5$ is a $C_{1-9}$ alkyl group.

2. An anthraquinone dye as claimed in claim 1, which is represented by the formula (I-2)

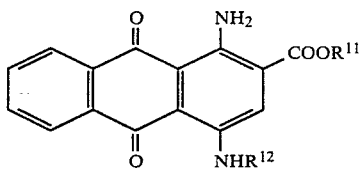

(I-2)

wherein $R^{11}$ is a trans-4-alkylcyclohexyl group, trans-4-cyclohexylcyclohexyl group, trans-4-alkylcyclohexylcyclohexyl group, or p-(trans-4-alkylcyclohexyl)phenyl group; and $R^{12}$ is an alkyl group which may be substituted with an alkoxy group, or a cycloalkyl, aralkyl or aryl group which may be substituted with an alkyl group, alkoxy group or alkylcyclohexyl group.

3. An anthraquinone dye as claimed in claim 1, which is represented by the formula (I-3)

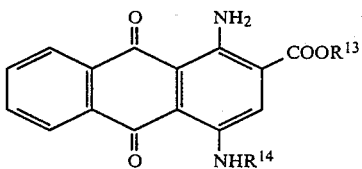

(I-3)

wherein $R^{13}$ is a trans-4-alkylcyclohexyl group and $R^{14}$ is an aralkyl or aryl group which may be substituted with an alkyl group or alkoxy group.

4. In a liquid crystal composition comprising at least one host liquid crystal and at least one pleochroic dye dissolved as a guest in said at least one host liquid crystal, wherein said at least one pleochroic dye includes at least one anthraquinone dye represented by the formula (I)

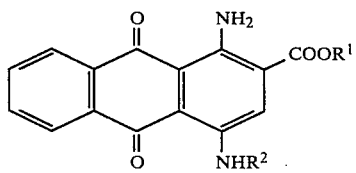

(I)

wherein $R^1$ is a trans-4-alkylcyclohexyl group, a trans-4-cyclohexylcyclohexyl group, a trans-4-alkylcyclohexylcyclohexyl group, a p-(trans-4-alkylcyclohexyl)phenyl group, an alkyl group which may be substituted with an alkoxy group or an alkylamino group, or an aralkyl or aryl group which may be substituted with an alkyl group, an aralkyl group, an aryl group, an alkoxy group, or an alkylamino group; and $R^2$ is an alkyl group which may be substituted with an alkoxy group, an alkylamino group, an cycloalkyl group, or an alkylcycloalkyl group; or a cycloalkyl, aralkyl, or aryl group which may be substituted with an alkyl group, an alkoxy group, an alkylamino group, an cycloalkyl group, an alkylcycloalkyl group, an aryl group, an aralkyl group, or an alkoxyalkyl group, with the proviso that when $R^1$ is a substituted alkyl group, aralkyl group, or aryl group, at least one of $R^1$ and $R^2$ is as follows:

$R^1$ is a $C_{5-18}$ alkyl group,

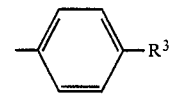

or

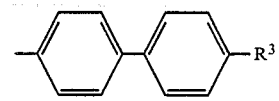

wherein $R^3$ is a $C_{5-9}$ alkyl group or alkoxy group; $R^2$ is a $C_{5-18}$ alkyl group,

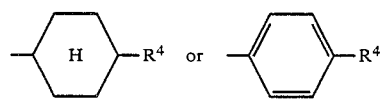

wherein $R^4$ is a $C_{1-9}$ alkyl group, alkoxy group,

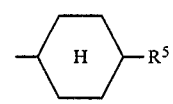

or

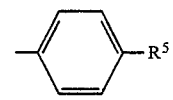

wherein $R^5$ is a hydrogen atom, $C_{1-9}$ alkyl group, or alkoxy group.

* * * * *